United States Patent
Andrew (10) Patent No.: US 12,148,138 B2
(45) Date of Patent: Nov. 19, 2024

(54) PROCESS PARAMETER PREDICTION USING MULTIVARIANT STRUCTURAL REGRESSION

(71) Applicant: Carl Zeiss X-ray Microscopy, Inc., Pleasanton, CA (US)

(72) Inventor: Matthew Andrew, Pleasanton, CA (US)

(73) Assignee: Carl Zeiss X-ray Microscopy, Inc., Pleasanton, CA (US)

( * ) Notice: Subject to any disclaimer, the term of this patent is extended or adjusted under 35 U.S.C. 154(b) by 514 days.

(21) Appl. No.: 17/033,779

(22) Filed: Sep. 26, 2020

(65) Prior Publication Data

US 2021/0182597 A1 Jun. 17, 2021

Related U.S. Application Data

(60) Provisional application No. 62/906,887, filed on Sep. 27, 2019.

(51) Int. Cl.
| | | |
|---|---|---|
| *G16C 20/30* | (2019.01) | |
| *G06F 17/18* | (2006.01) | |
| *G06N 3/02* | (2006.01) | |
| *G06N 20/00* | (2019.01) | |
| *G06T 7/00* | (2017.01) | |
| *G16C 20/70* | (2019.01) | |

(52) U.S. Cl.
CPC ............ *G06T 7/0004* (2013.01); *G06F 17/18* (2013.01); *G06N 3/02* (2013.01); *G06N 20/00* (2019.01)

(58) Field of Classification Search
USPC ....... 175/24–72; 299/1.05–30; 382/100–109, 382/128–160; 706/1–62
See application file for complete search history.

(56) References Cited

U.S. PATENT DOCUMENTS

| | | | | |
|---|---|---|---|---|
| 2002/0177167 A1* | 11/2002 | Levinson | ............... | G16C 20/60 435/7.1 |
| 2017/0017011 A1* | 1/2017 | Howard | ............... | G01N 33/241 |
| 2019/0266501 A1* | 8/2019 | Tavares | ................. | G06N 5/04 |
| 2021/0090694 A1* | 3/2021 | Colley | .................. | G16H 50/70 |
| 2021/0209247 A1* | 7/2021 | Mohassel | ............. | A63B 69/004 |

FOREIGN PATENT DOCUMENTS

WO   WO-2009126881 A2 *   10/2009   ............. E21B 47/00

OTHER PUBLICATIONS

Nattavadee Srisutthiyakorn et al; "Deep Learning Methods for Predicting Premeability from 2-D/3-D Binary Segmented Images," SEG Technical Program Expanded Abstracts, 3042-3046 (2016). (Year: 2016).*

(Continued)

*Primary Examiner* — Marcellus J Augustin
(74) *Attorney, Agent, or Firm* — HoustonHogle LLP (57) ABSTRACT

Multivariant feature extraction is used for training volumes or 2D images, (real or synthetic) coupled to process (effective) values probably obtained from direct simulation. These features are coupled with machine learning/regression algorithms to make a predictive model for the effective property. This model can then be used on a real geometry of a sample for effective parameter prediction.

20 Claims, 5 Drawing Sheets

(56) References Cited

OTHER PUBLICATIONS

Sudakov Oleg et al.; "Driving Digital Rock Towards Machine Learning: Predicting Permeability with Gradient Boosting and Deep Neural Networks," Computers and Geoscience, 127: 91-98 (2019). (Year: 2019).*
Method to Generate Numerical Pseudocores Using Borehole Images, Digital Rock Samples, and Multi-Point Statistics (Year: 2009).*
Zhang Tuanfeng; Method to Generate Numerical Pseudocores Using Borehole Images, Digital Rock Samples, and Multi-Point Statistics; 2009 (Year: 2009).*
Exxonmobil; Method For Determining The Properties Of Hydrocarbon Reservoirs From Geophysical Data; 2009 (Year: 2009).*
Method For Determining The Properties Of Hydrocarbon Reservoirs From Geophysical Data (Year: 2009).*
Andrew, M., "Comparing Organic-Hosted and Intergranular Pore Networks: Topography and Topology in Grains, Gaps and Bubbles," Geological Society, London, Special Publications, 484: 241-253 (2018).
Anonymous, "OpenPNM—An Open Source Pour Network Modeling Package," http://openpnm.org/ 1-5 (2020).
Mosser, L., et al., "Reconstruction of Three-Dimensional Porous Media Using Generative Adversarial Neural Networks," Phys. Rev., E96: 043309 (2017).
Okabe, H., et al., "Prediction of Permeability for Porous Media Reconstructed Using Multi-Point Statistics," Phys. Rev., E 70, 066135 (2004).
Roberts, A.P., "Statistical Reconstruction of Three-Dimensional Porous Media from Two-Dimensional Images," Phys. Rev., E 56, 3203 (1997).
International Search Report and Written Opinion of the International Searching Authority, mailed on Dec. 9, 2020, from International Application No. PCT/US2020/052968, filed on Sep. 26, 2020. 14 pages.
Srisutthiyakorn, N., "Deep Learning Methods for Predicting Premeability from 2-D/3-D Binary Segmented Images," SEG Technical Program Expanded Abstracts, 3042-3046 (2016).
Andrew, M., "Premeability Prediction Using Multivariant Structural Regression," E3S Web of Conferences, 146: 1-7 (2019).
Sudakov, O., et al., "Driving Digital Rock Towards Machine Learning: Predicting Permeability with Gradient Boosting and Deep Neural Networks," Computers and Geoscience, 127: 91-98 (2019).
International Preliminary Report on Patentability mailed on Apr. 7, 2022, from International Application No. PCT/US2020/052968, filed on Sep. 26, 2020. 8 pages.
Wu, K., et al., "3D Stochastic Modelling of Heterogeneous Porous Media—Applications to Reservoir Rocks," Transport in Porous Media, 65: 443-467 (2006).

* cited by examiner

PROCESS PARAMETER PREDICTION USING MULTIVARIANT STRUCTURAL REGRESSION

RELATED APPLICATIONS

This application claims the benefit under 35 USC 119(e) of U.S. Provisional Application No. 62/906,887, filed on Sep. 27, 2019, which is incorporated herein by reference in its entirety.

BACKGROUND OF THE INVENTION

Various imaging modalities have been used to identify and visualize the internal microscopic structure of natural and synthetic samples both in two dimensions (2D) and in three dimensions (3D). For example, these imaging modalities can analyze various types of samples such as rock samples from oil and gas extraction operations, additively manufactured items, or other natural or man-made things.

Non-destructive imaging systems include x-ray computed tomography (CT) microscopy and Scanning Electron Microscopy (SEM) systems. These systems provide the ability to visualize features such as pores, organics and minerals in the samples. Other examples include light microscopy including light based tomography techniques such as optical coherence tomography.

The X-ray CT microscopy systems irradiate the sample with x-rays, typically in a range between 1 and several hundred keV. 2D projection images are collected at multiple angles and a 3D volume of the sample is reconstructed from the projections.

SEM systems instead irradiate the sample surface with a beam of high energy electrons, typically between 500 eV and 30 keV. The signals derived from electron-sample interaction are used in constructing high resolution 2D images of the sample surface. This enables the simultaneous operation of SEM in multiple modes such as Back Scattered Electron (BSE), Secondary Electron (SE), Energy Dispersive X-ray (EDX), and Cathodoluminescence (CL) modes. EDX is typically the primary system on a SEM that offers quantitative mineralogy information which enables 2D mineral mapping of the sample surface.

Destructive imaging systems include Focused Ion Beam Scanning Electron Microscope (FIB-SEM) systems. A FIB-SEM is a multiple beam system that integrates ion beam and electron beam systems. The FIB system irradiates the sample with a focused high-current beam of ions of a source material such as gallium to mill the sample surface with high precision. The milled surface is then imaged at high resolution using the integrated SEM system. The FIB milling and SEM imaging process is repeated until a desired volume is sampled. The SEM images from each slice are stacked to construct a 3D volume of the milled region of the sample.

Often these 2D and 3D imaging modalities are used determine predict parameters of the samples. In typical operation, these imaging modalities create image datasets such as 3D volumes or 2D images. Image analysis techniques are then employed to infer composition and structures from the volumes and/or images. Physics simulations can then be used to determine or predict various parameters of interest. Porosity and mineralogy, flow parameters and other mechanical parameters are derived from these simulations.

SUMMARY OF THE INVENTION

The present invention concerns an analysis method that employs a regression technique that offers a way by which macroscopic (effective) parameters of samples, imaged in X-ray microscopes, SEM's and/or other imaging systems, can be predicted. The parameters of interest can be computed directly from multivariant structural statistics without having to perform expensive full physics simulations/computations. It also allows for predictive models to be created which are effective when imaging a sample using merely 2D imaging techniques, eliminating the need to image them with 3D techniques which can be expensive, slow, and limited in the spatial lengthscale they have accessible to them.

The approach contrasts with the state of the art. Typically, the approach to predict parameters employs expensive computationally complex full physics simulations, requiring extensive resources, or utilizes highly simplified/analytical approaches to prediction, leading to significantly inaccurate results.

The present approach instead takes a multivariant (machine learning based) approach, which can greatly speed up predictions (estimating orders of magnitude speedups) while maintaining prediction robustness. This machine learning based model is trained using a large number of representative structures, which can either be taken from a library or database, or can be created using a geometry creation technique.

As a result, any specific geometry creation routine may be able to be substituted—the critical factor is that the simulated geometries should well represent the real (imaged) geometries, and so act as an extrapolative guide. That said, it is possible, given enough real geometries, that the whole step of creating simulated geometries for structural regression could be bypassed, only using real geometries to define both feature vectors and target functions.

In general, according to one aspect, the invention features a method for determining parameters of a sample. The method comprises performing parameter estimation process by creating a prediction model from images and making final predictions using real geometry of a sample and the prediction model.

In examples, the prediction model is created from synthetic images and/or actual images.

Preferably the prediction model is generated using multivariant regression, such as by computing process parameters from the images, segmenting the images into objects, extracting features from the images and computing statistics across the objects of the images.

In some examples, the prediction model is created by feeding images into a convolutional neural network which maps from image area to a variable or other machine learning approach.

Then, the final predictions are performed by extracting feature vectors from the sample and employing the prediction module to determine the parameters of the sample.

In examples, the sample is from mining and/or oil/gas extraction. Other examples involve an additive manufacturing process.

In current embodiments, the parameter estimation process is performed on 3D image datasets, such as from an x-ray CT microscope, and the final predictions are made from 2D image datasets, such as from 2D electron or optical microscope image datasets.

In general, according to one aspect, the invention features a system for determining parameters of a sample. The system comprises a machine learning application, executing on a computer system, for example, performing parameter estimation process by creating a prediction model from images. Then, the machine learning application makes final predictions using real geometry of a sample and the prediction model.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Important macroscopic or effective parameters of a sample include but are not limited to the sample's permeability, diffusivity, elastic moduli, electrical characteristics, and single or multiphase transport processes. These parameters are frequently calculated from 3D tomographic images using computational simulation of partial differential equations.

Figure 1:
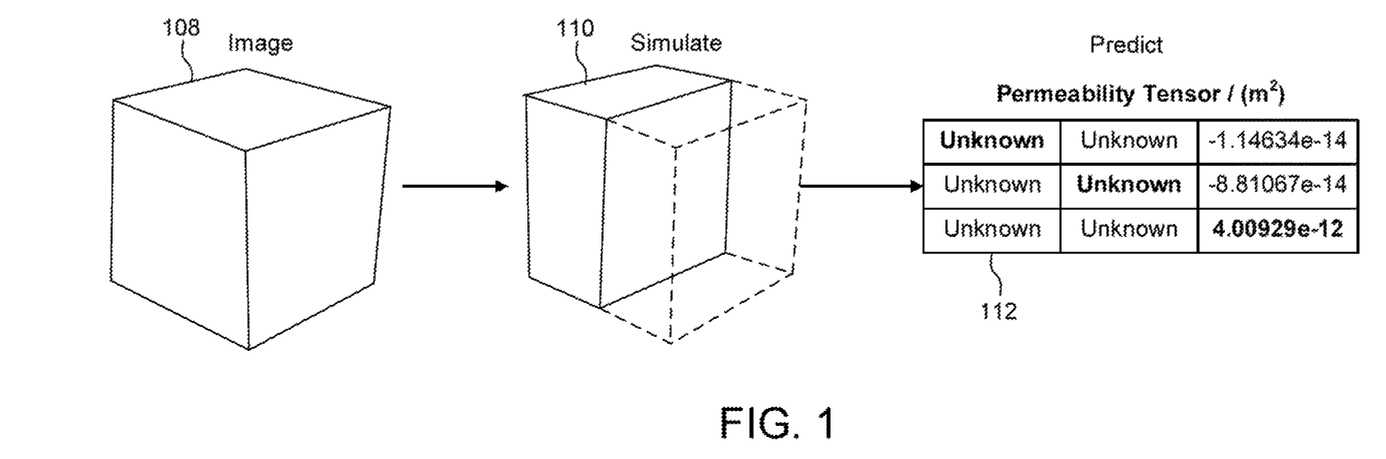
FIG. 1 is a schematic diagram illustrating the conventional approach of using partial differential equations to computationally simulate a sample's parameters.

FIG. 1 illustrates the conventional approach of using partial differential equations to computationally simulate a sample's parameters.

A 3D volume 108 of a sample, such as one created by tomographic reconstruction from x-ray projections through the sample, is used to create a full physics simulation 110. This simulation 110 is then used to predict the sample's process parameters of interest such as the sample's permeability 112.

Performing a full physics simulation is extremely computationally expensive, however. The physical processes must be computed explicitly step by step in time.

Figure 2:
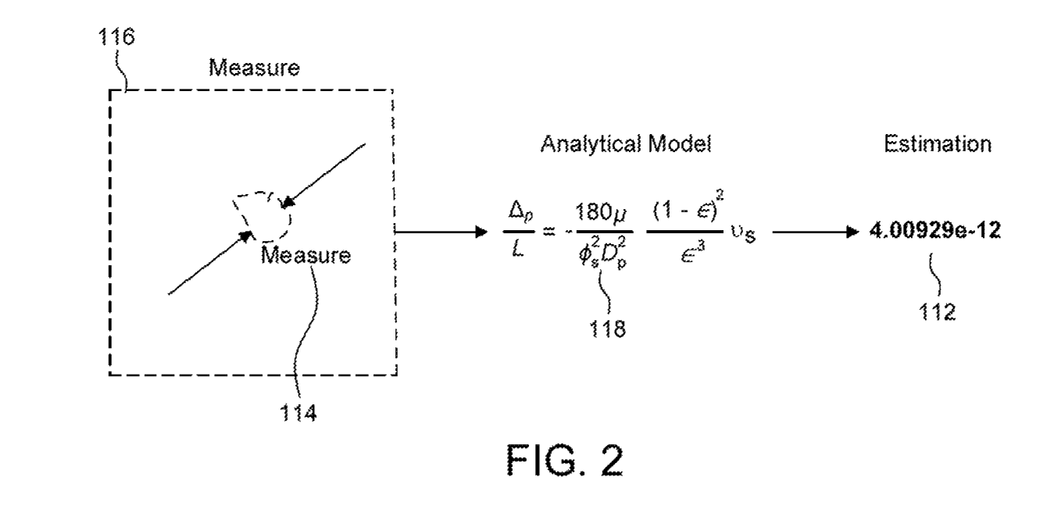
FIG. 2 is a schematic diagram illustrating another conventional approach is to estimate parameters of a sample employing a set of univariant measurements.

FIG. 2 illustrates another conventional approach is to estimate parameters of a sample. A set of univariant measurements are made to the sample. In the illustrated example, the measurements 114 are made from a 2D slice 116 taken from a 3D tomographic image or 2D SEM images from cross-sections of the sample, for example. These measurements are then used as the input into quasi-analytical equations 118, which predict process parameters 112.

Such quasi-analytical approaches are extremely simplified, however. As a result, they tend to have large prediction errors. The predicted parameters, however, do inherently depend on the structural features of the network, and as such it should be possible to make a direct prediction from these features.

Figure 3A:
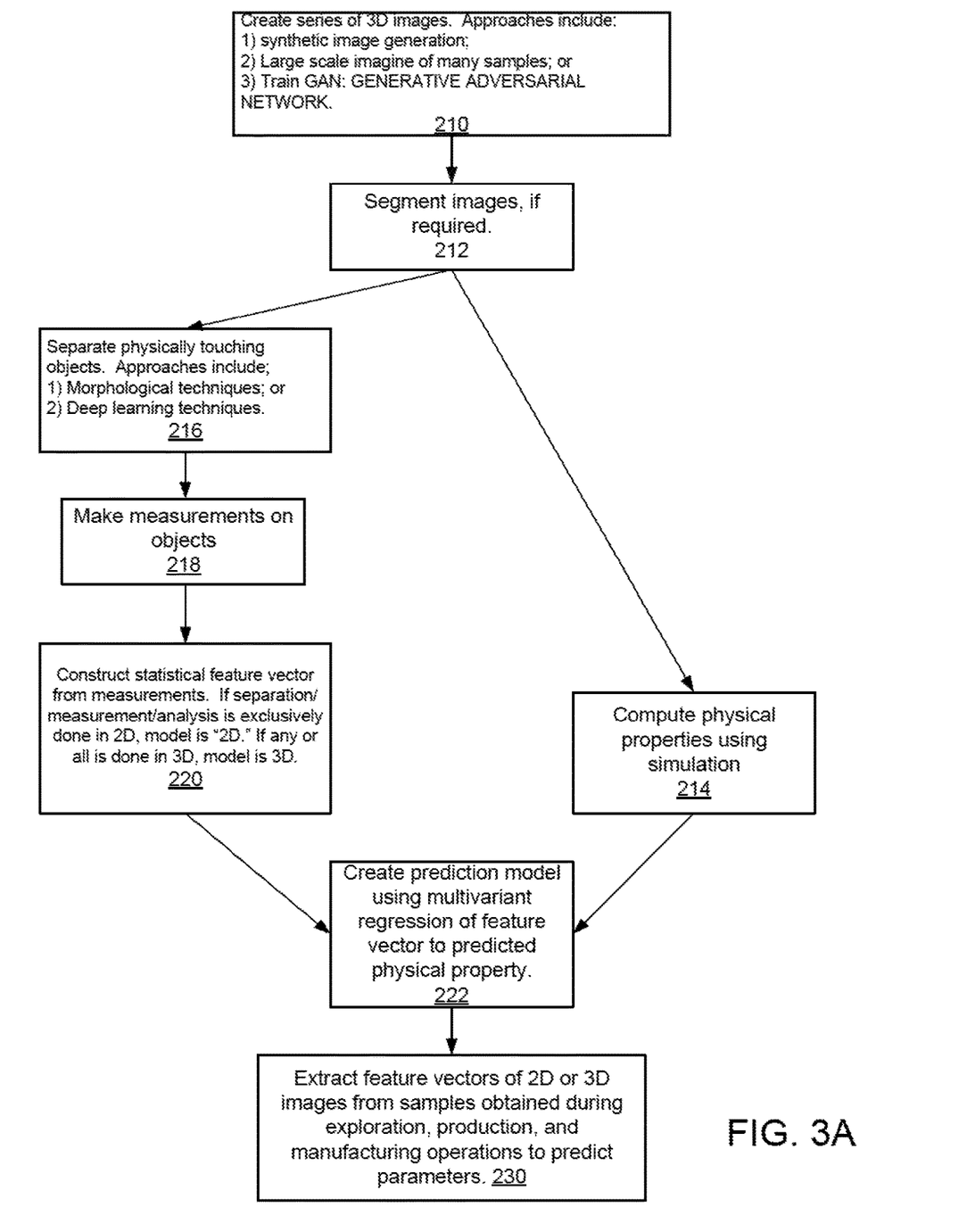
FIG. 3A is a flow diagram showing a parameter estimation process according to the present invention.

FIG. 3A is a flow diagram showing a parameter estimation process according to the present invention.

In step 210, series of synthetic or real images are generated or collected bearing similar statistical and process parameter properties.

Such synthetic images can be generated using a suite of statistical or object based techniques. An example of such an object based technique can be one of the following:

1. Statistical reconstruction of three-dimensional porous media from two-dimensional images, by Anthony P. Roberts, Phys. Rev. E 56, 3203. 1997.
2. Prediction of permeability for porous media reconstructed using multiple-point statistics, Hiroshi Okabe and Martin J. Blunt, Phys. Rev. E 70, 066135, 2004.
3. 3D Stochastic Modelling of Heterogeneous Porous Media—Applications to Reservoir Rocks, Transport in Porous Media volume 65, pages 443-467(2006).
4. Comparing organic-hosted and intergranular pore networks: topography and topology in grains, gaps and bubbles, Matthew Andrew, Geological Society, London, Special Publications, 484, 3 Sep. 2018.
5. Reconstruction of three-dimensional porous media using generative adversarial neural networks, Lukas Mosser, Olivier Dubrule, and Martin J. Blunt, Phys. Rev. E 96, 043309, 2017.

In other examples, the images are not necessarily synthetic. For example, the real images could be images obtained from actual samples. In general, however, the synthetic images have the advantage that many can be created with relative ease.

The synthetic or hybrid or actual images are then segmented into individual phases, such as phases, pores, grains, or other structures in the images in step 212.

The process then bifurcates.

The process parameters and other physical properties are computed from these images using traditional modelling or physics simulation techniques in step 214. Examples of appropriate modeling tools include such open source projects as OpenFOAM, a large number of academic codes (e.g. https://www.imperial.ac.uk/earth-science/research/research-groups/perm/research/pore-scale-modelling/software/ or http://openpnm.org/), or internal industrial software projects (such as Schlumberger Direct HydroDynamic (DHD) simulation) as well as a suite of commercial software packages, including ThermoFisher Avizo Xlab, ThermoFisher eCore, ThermoFisher Pergeos, VolumeGraphics VGStudio, Comsol, Abaqus and Math2Market GeoDict simulation packages.

In parallel, the images are analyzed to separate physically touching objects in step 216. Objects are defined as contiguous regions belonging to a single phase. Approaches include morphological techniques or deep learning techniques.

Then in step 218, measurements of the objects are made.

Statistical feature vectors are constructed from the measurements in step 220. If separation/measurement/analysis is exclusively done in 2D, model is "2D." If any or all is done in 3D, model is 3D.

In general, the extracted features could relate to a wide array of properties measured in the image, and may vary from predicted process (effective) parameter to predicted process (effective) parameter, and may be extracted in 2D or in 3D. Note that as it is possible to create a model from features extracted from a 2D slice from a 3D network, it is possible to create a predictive model which operates only from 2D data. This allows for effective multivariate predictions to be made even when the only data available is 2D.

A prediction model is then creates using multivariant regression of feature vectors to predicted physical property based on the constructed feature vectors and the computed physical properties in step 222.

Generally, statistics are computed across all the objects in the image. These statistics are then used in a multivariant description of the network as a whole. This multivariant description is then regressed against the parameter values using multivariant linear or non-linear regression to create the prediction model. In fact, any number of regression techniques may be used.

Then, in step 230, the prediction model is used to determine the physical properties of samples from 2D or 3D images. These samples are taken from mineral and/or oil/gas exploration and production. The samples could also come from manufacturing operations such as the manufacture of batteries and powder bed 3D additive manufacturing. The features vectors are extracted and given to the prediction model of step 222 to predict the parameters of the samples.

Figure 3B:
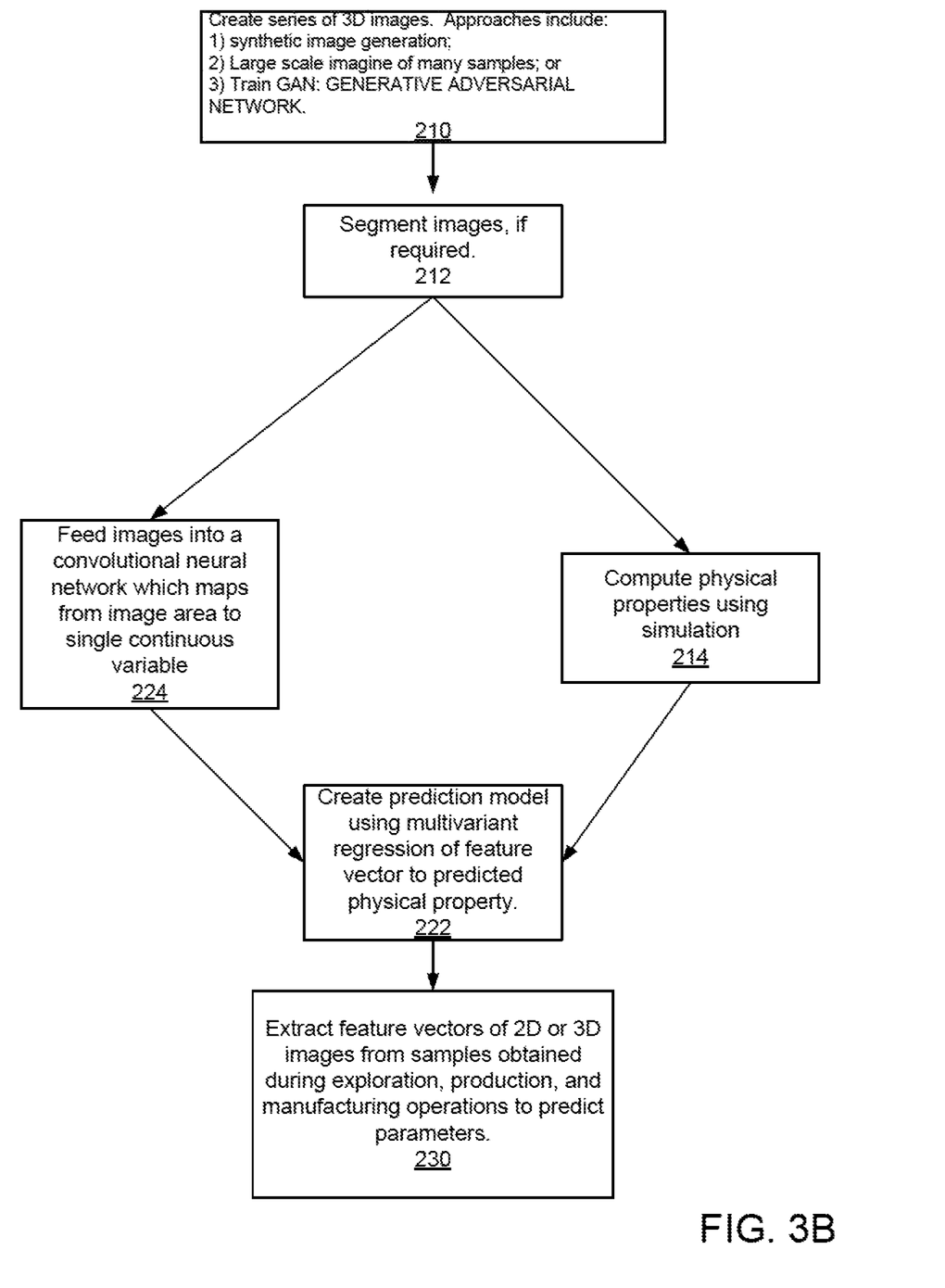
FIG. 3B is a flow diagram showing a parameter estimation process according to another embodiment.

FIG. 3B is a flow diagram showing a parameter estimation process according to another embodiment.

Here, the images from steps 210 and 212 are fed into a convolutional neural network which maps from image area to single continuous variable.

Then, as before, a prediction model is created in step 222 using multivariant regression of feature vectors to predicted physical property based on the constructed feature vectors and the computed physical properties from step 214.

Figure 4:
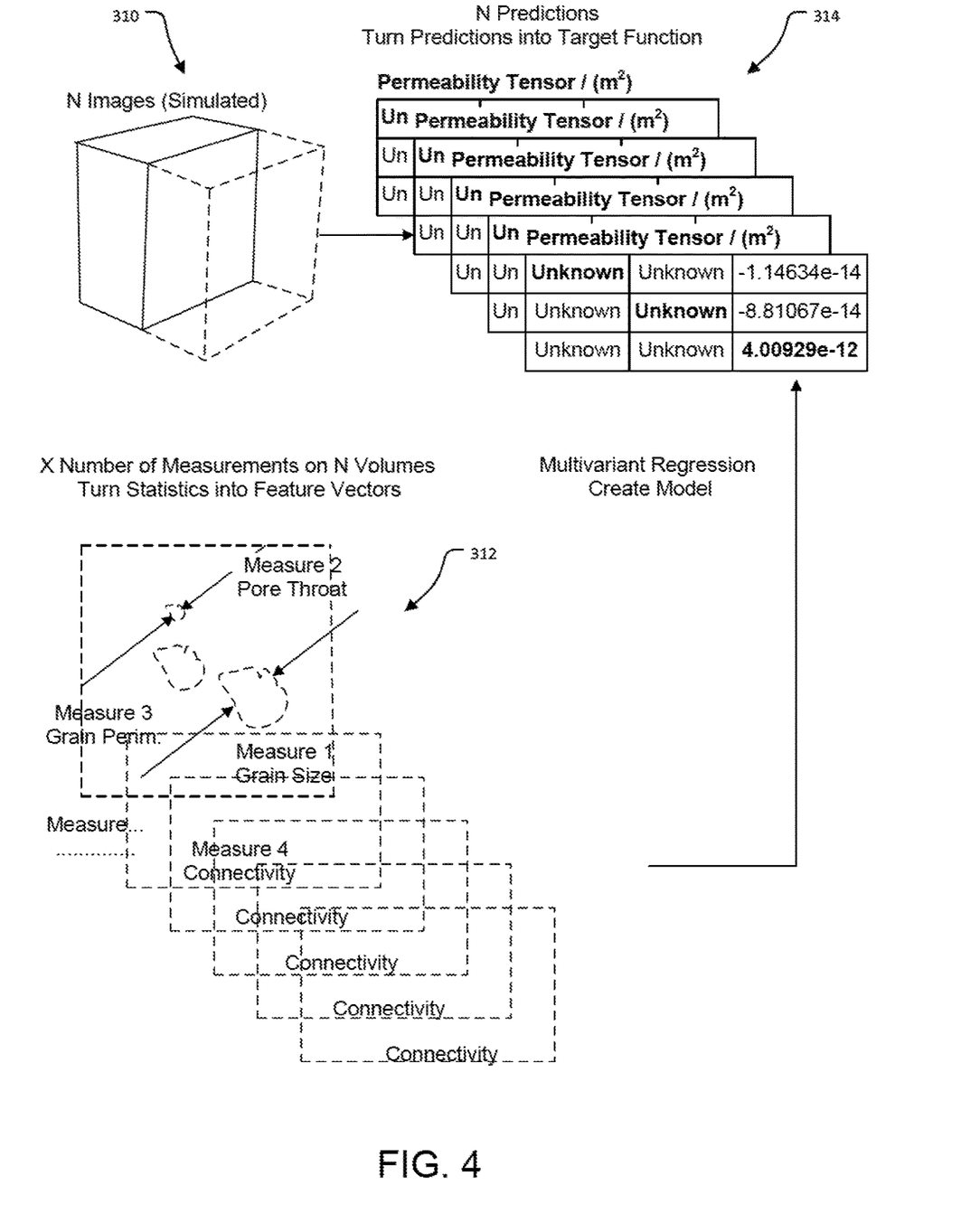
FIG. 4 is a schematic diagram illustrating this process of creating a prediction model by multivariant regression.

FIG. 4 illustrates this process of creating a prediction model by multivariant regression of X features or parameters on a target function created by simulating process parameters on N synthetic volumes.

In more detail, the N images 310 are simulated as described in connection with step 210 of FIGS. 3A and 3B. Or real images or a combination of real and synthetic images are used.

Another approach would be to perform a direct regression from the images using 2D or 3D networks (bypassing the need for structural statistical extraction).

Structural parameters can then be calculated 312 on real and/or synthetic (imaged) geometries as in step 218 and applied to predict the process parameter.

Incremental imaged and simulated volumes can be added to the training set for multivariant regression 314, or used as to create new regression sequences, or as the basis for transfer learning from the original set.

Figure 5:
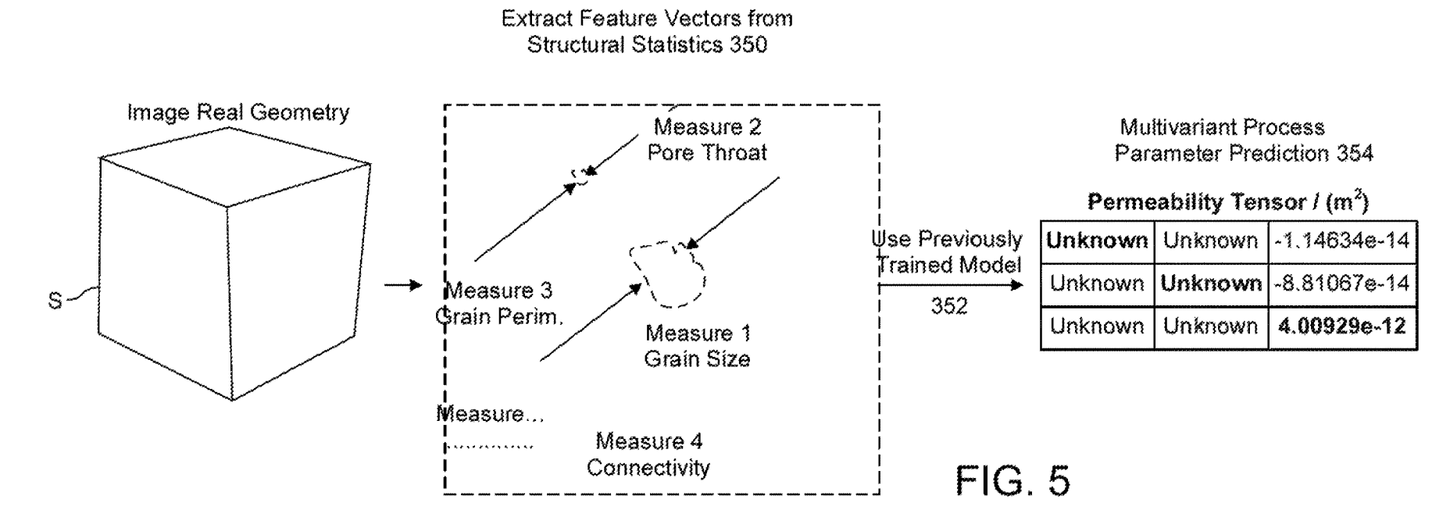
FIG. 5 is a schematic diagram showing the final step of making final predictions using (imaged) real geometry of a sample S.

FIG. 5 shows the final step of making final predictions as set forth in step 230 of FIGS. 3A and 3B, using (imaged) real geometry of a sample S. The feature vectors are extracted 350 from the volume of the same and the statistics of analytical features calculated. These vectors are then input into previously trained multivariant model to make process parameter predictions 352 as described in step 230.

The present approach could be extended to other machine learning tools such as neural networks. The model could be a trained neural network which takes as an input directly the 2D or 3D image structures from the training set, or the statistical feature set extracted from these images. Other alternatives are random forest regression or other multivariant regression models.

An example application of this technology is the prediction of permeability parameters from 2D images generated from light and/or electron microscopy.

Typically, such prediction of permeability is performed (at the pore scale) by performing 3D computational fluid dynamics on x-ray microscopy image datasets. The challenge with this approach is that the addressable spatial lengthscale with these (or, more precisely, its ratio with the voxel resolution of the volume) is extremely limited.

In contrast, the present approach can use multivariant regression based prediction, applied to 2D light and/or electron microscopy image data, which can be acquired over a much larger spatial lengthscale.

In general, sample permeability is critical to understand a range of applications from subsurface oil and gas flow, to carbon capture and storage, to filter performance, battery performance and more.

Figure 6:
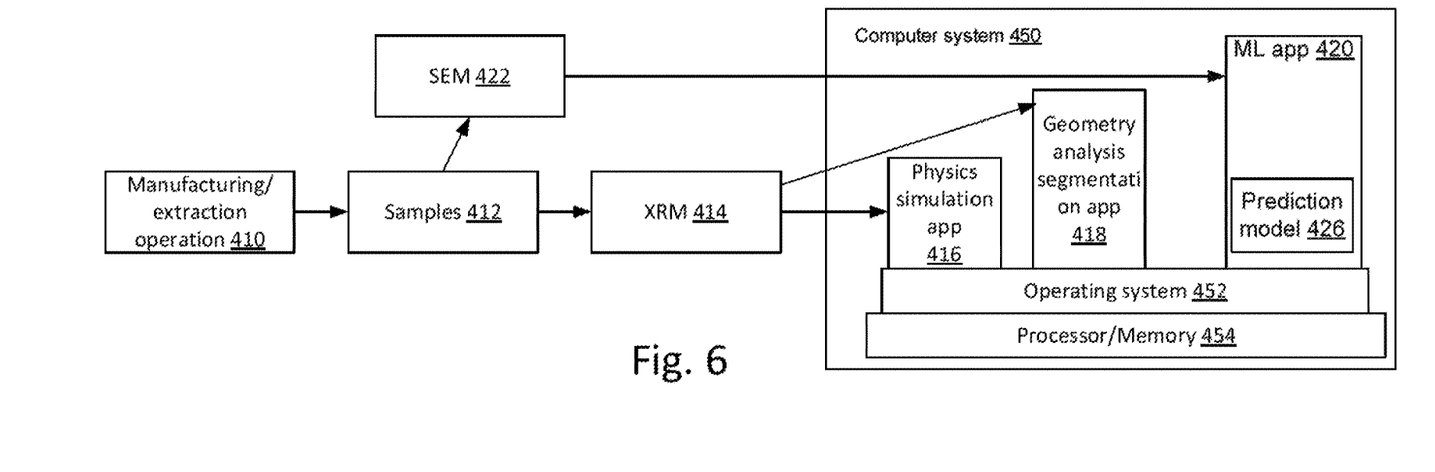
FIG. 6 is a block diagram showing a hardware system on which an exemplary process/workflow is implemented.

This takes the following process/workflow, which is described in connection with FIG. 6:

First, a suite of segmented training images is required. These can be produced by a range of approaches as set forth in step 210:

a. Image library. If samples have been imaged then these image datasets can be used for training, but a broad range of samples is required. In one example, the image datasets are 3D dataset from an x-ray microscope. This is shown in FIG. 6, where a manufacturing or extraction operation 410 produces actual, physical samples 412 that are imaged in an x-ray CT microscope 414.

b. Synthetic image creation. This has the advantage of not requiring many images of many samples, but may only be representative of certain pore systems.

c. AI based statistical image realization. Generative networks (e.g., GANs) can be trained on a relatively limited subset of original images, extending them over a much broader range of input parameters.

Second, flow is simulated in each of these geometries. This is performed using standard computational fluid dynamics techniques using a physics simulation application 416.

Such a physics simulation application 416 is executed on a computer system 450 such as computer workstation or computer cluster or a cloud-based computer system. The computer system 450 has a hardware system 454 including one or more microprocessors and attendant memory, along with other storage resources. An operating system 452 will typically execute on the hardware system. The operating system 452 provides access to the compute resources for the various applications executing on the operation system such as the physics simulation applications 416.

In parallel, each geometry is analyzed to extract a statistical feature vector of the geometry in step 220. This uses image or 3D volume analysis app 418 that executes on the computer system 450 or another computer system. The 3D volume analysis app 418 performs following sub-workflow in one example:

a. 2D slices are randomly extracted from the volume. Each slice is analyzed independently.
  b. Objects within each slice are separated as in step 216. This uses a multi-scale object separation routine. Pores and grains are separated independently. The multiscale object separation can be performed as follows: 1. a Euclidian (or chamfer) distance transform is calculated on the objects, 2. small object seeds are created by identifying local maxima in the distance transform, 3. large object seeds are created by segmenting the distance transform, 4. the union between the two seed objects is evaluated, 5. this image is then analyzed to identify connected components, with each forming the seed of a separated object, and 6. These seeds are then grown on the landscape of the distance transform image using a watershed algorithm.
  c. This generates a separated pore and grain image. A final "pore throat" image is created by 3D volume analysis app 418 evaluating the regions when two separated pore objects touch.
  d. Measurements are then made on each of these objects, creating a set of features as in step 218 by the 3D volume analysis app 418. Many different measurements are possible. Example measurements include:

TABLE 1

| Feature/unit |
| --- |
| Inscribed circle radius/μm |
| Area/μm$^2$ |
| Euler number |
| Coordination number |
| Perimeter/μm |
| Convexity | e. From this list of features, statistical measures are made on each feature as in step 220. A range of different statistical measures are possible, but an example evaluated for permeability prediction from thin section are:

TABLE 2

| Feature/unit |
| --- |
| Throat inscribed radius standard deviation/μm |
| Pore inscribed radius mean/μm |
| Average throat inscribed radius/μm |

TABLE 2-continued

| Feature/unit |
| --- |
| Largest throat inscribed radius/μm |
| Pore inscribed radius standard deviation/μm |
| Largest pore inscribed radius/μm |
| Pore inscribed radius area weighted mean/μm |
| Porosity |
| Fraction of pores with coordination number 2 |
| Pixel size/μm |
| Grain inscribed radius standard deviation/μm |
| Coordination number 0 |
| Grain inscribed radius mean/μm |
| Area weighted mean pore area/μm$^2$ |
| Largest grain inscribed radius/μm$^2$ |
| Lognorm Fitted Pore Area/μm$^2$ |
| Pore area standard deviation/μm$^2$ |
| Largest pore area/μm$^2$ |
| Grain inscribed radius weighted mean/μm |
| Fraction of pores with coordination number 3 |
| Mean pore area/μm$^2$ |
| Maximum pore area/μm$^2$ |
| Fraction of pores with coordination number 4 |
| Fraction of pores with coordination number 1 |
| Euler number (porosity) |
| Largest grain area/μm$^2$ |
| Fraction of pores with coordination number 5 |
| Lognorm fitted grain area/μm$^2$ |
| Euler number (volume weighted, grain) |
| Euler number (grain) |
| Lognorm fitted pore number standard deviation |
| Euler number (volume weighted, pore) |
| Fraction of pores with coordination number 6 |
| Fraction of pores with coordination number 7 | f. This then provides a statistical feature vector description of the pore network. Measurements (from step d) can be aggregated across multiple slices prior to statistical measurement to increase the robustness of the measure.

Third, a prediction model 426 is created using multivariant regression, e.g. using a Random Forest, multi-layer perceptron, support vector machine or other machine learning approach as in step 222. In the illustrated example, the machine learning is performed by a machine learning app 420 executing on the computer system 450 which received that statistical feature vector descriptions from the geometry app 418.

Finally, once this model 426 is created, it can be applied on any 2D image dataset (e.g. image dataset from a light microscope or electron microscope), once that data has been segmented into pore and grain (features were only extracted from 2D slices) as in step 230. This allows for much larger spatial lengthscales to be applied in a reasonable period of time.

In the illustrated example, new samples 412 produced by the manufacturing or extraction operation 410 are imaged in a SEM 422 and the images are provided directly to the machine learning app 420 that applies the prediction model 426 or first provided to the geometry app that then provides their statistical feature vector descriptions to the machine learning app 420.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining parameters of a sample, comprising:

performing a parameter estimation process by creating a prediction model from images from an x-ray computed tomography system by modeling or simulating physical properties from the images; and transferring the prediction model to make final predictions using real geometry of the sample collected with an electron microscope or an optical microscope providing two-dimensional image datasets and the prediction model, wherein the prediction model is generated using multivariant regression in which incremental imaged and simulated volumes are used for the multivariant regression.

2. The method of claim 1, wherein the prediction model is created from synthetic images.

3. The method of claim 1, wherein the prediction model is created from actual images.

4. The method of claim 1, wherein the prediction model is generated by computing process parameters from the images, segmenting the images into objects, extracting features from the images and computing statistics across the objects of the images.

5. The method of claim 4, wherein the prediction model is created by determining feature vectors from statistics determined from the images and then creating the prediction model by multivariate regression.

6. The method of claim 1, wherein the prediction model is created by feeding images into a convolutional neural network which maps from image area to a variable.

7. The method of claim 1, wherein the prediction model is generated using machine learning.

8. The method of claim 1, wherein the final predictions performed by extracting feature vectors from the sample and employing the prediction module to determine the parameters of the sample.

9. The method of claim 1, wherein the sample is from mining and/or oil/gas extraction.

10. The method of claim 1, wherein the sample is from an additive manufacturing process.

11. The method of claim 1, wherein the parameter estimation process is performed on 3D image datasets.

12. The method of claim 11, wherein the parameter estimation process is performed on 3D image datasets from the x-ray computed tomography system.

13. The method of claim 1, wherein the two-dimensional image datasets have a larger length scale than the images used to create the prediction model.

14. The method of claim 1, wherein the incremental imaged and simulated volumes are added to a training set for the multivariant regression.

15. The method of claim 1, wherein the incremental imaged and simulated volumes are used to create new regression sequences.

16. The method of claim 1, wherein the incremental imaged and simulated volumes are used as a basis for transfer learning from an original training set.

17. The method of claim 1, wherein the prediction model is generated using random forest regression.

18. A system for determining parameters of a sample, comprising:

a machine learning application, comprising a convolutional neural network, the machine learning application receiving images from an x-ray computed tomography system;

the machine learning application performing a parameter estimation process by creating a prediction model from the images by modeling or simulating physical properties from the images using the convolutional neural network which maps from image area to a variable; and the machine learning application transferring the prediction model to make final predictions of the parameters using real geometry of the sample collected with an electron microscope or an optical microscope providing two-dimensional image datasets.

19. The system of claim 18, wherein the parameter estimation process is performed based on 2D images from 3D image datasets.

20. The system of claim 18, wherein the two-dimensional image datasets have a larger length scale than the images used to create the prediction model.

* * * * *